United States Patent
Kim et al.

(10) Patent No.: US 12,486,440 B2
(45) Date of Patent: Dec. 2, 2025

(54) SURFACE PROTECTIVE FILM FOR OPTICAL MEMBER

(71) Applicant: LG CHEM, LTD., Seoul (KR)

(72) Inventors: So Jin Kim, Daejeon (KR); Hyun Cheol Kim, Daejeon (KR); Jeong Min Choi, Daejeon (KR); Hyun Goo Kang, Daejeon (KR); Jae Seung Lim, Daejeon (KR)

(73) Assignee: Xinmei Fontana Holding (Hong Kong) Limited, Hong Kong (CN)

( * ) Notice: Subject to any disclaimer, the term of this patent is extended or adjusted under 35 U.S.C. 154(b) by 690 days.

(21) Appl. No.: 17/783,614

(22) PCT Filed: Dec. 11, 2020

(86) PCT No.: PCT/KR2020/018136
§ 371 (c)(1),
(2) Date: Jun. 8, 2022

(87) PCT Pub. No.: WO2021/118283
PCT Pub. Date: Jun. 17, 2021

(65) Prior Publication Data
US 2023/0015861 A1    Jan. 19, 2023

(30) Foreign Application Priority Data
Dec. 11, 2019  (KR) .................... 10-2019-0164905

(51) Int. Cl.
| | | |
|---|---|---|
| *C09J 175/14* | (2006.01) | |
| *C08K 5/00* | (2006.01) | |
| *C08K 5/07* | (2006.01) | |
| *C08K 5/10* | (2006.01) | |
| *C08K 5/101* | (2006.01) | |
| *C08K 5/103* | (2006.01) | |
| *C09J 4/06* | (2006.01) | |
| *C09J 7/20* | (2018.01) | |
| *C09J 175/16* | (2006.01) | |
| *H10K 50/844* | (2023.01) | |

(52) U.S. Cl.
CPC .......... *C09J 175/14* (2013.01); *C08K 5/0016* (2013.01); *C08K 5/0025* (2013.01); *C08K 5/0075* (2013.01); *C08K 5/07* (2013.01); *C08K 5/10* (2013.01); *C08K 5/101* (2013.01); *C08K 5/103* (2013.01); *C09J 4/06* (2013.01); *C09J 7/20* (2018.01); *C09J 175/16* (2013.01); *C09J 2203/326* (2013.01); *C09J 2301/312* (2020.08); *C09J 2301/408* (2020.08); *C09J 2475/00* (2013.01); *H10K 50/844* (2023.02)

(58) Field of Classification Search
None
See application file for complete search history.

(56) References Cited

U.S. PATENT DOCUMENTS

| | | | |
|---|---|---|---|
| 7,070,051 B2* | 7/2006 | Kanner | A61B 17/06133 206/460 |
| 9,452,608 B2* | 9/2016 | Okamura | C09D 11/38 |
| 10,717,907 B2* | 7/2020 | Wang | B32B 27/08 |
| 2011/0171472 A1* | 7/2011 | Husemann | C09J 5/06 428/521 |
| 2014/0142210 A1 | 5/2014 | Zhang et al. | |
| 2018/0051197 A1 | 2/2018 | France | |

FOREIGN PATENT DOCUMENTS

| | | | | |
|---|---|---|---|---|
| CN | 101583685 A | 11/2009 | | |
| JP | 2018172450 A | 11/2018 | | |
| KR | 10-0427023 B1 | 11/1997 | | |
| KR | 10-2013-0001894 A | 1/2013 | | |
| KR | 10-2013-0031033 A | 3/2013 | | |
| KR | 2015020863 A | * 2/2015 | | C08G 18/10 |
| KR | 10-1628435 B1 | 6/2016 | | |
| KR | 10-2018-0107732 A | 10/2018 | | |
| KR | 10-2019-0025190 A | 3/2019 | | |
| KR | 10-2019-0026250 A | 3/2019 | | |
| KR | 10-2019-0045014 A | 5/2019 | | |
| KR | 10-2019-0071558 A | 6/2019 | | |

OTHER PUBLICATIONS

Machine translation of KR 20150020863 A (Year: 2015).*
Ryu et al., "Synthesis and Properties of Eco-friendly Polyurethane Adhesive without Solvent: Effect of DPE-41, TDI, Initiator and Plasticizer Content", Journal of Environmental Science International, 23(11); 1909-1918, Nov. 2014.

* cited by examiner

*Primary Examiner* — Frank D Ducheneaux
(74) *Attorney, Agent, or Firm* — Ricky Lam

(57) ABSTRACT

The present invention provides a surface protective film which includes an adhesive layer on one surface of a substrate film, wherein the adhesive layer is a cured product of a composition containing: a urethane-based resin having a photoreactive group at the end or side chain thereof; a monofunctional (meth)acrylate monomer; a crosslinking agent having two or more photoreactive groups at the end thereof; a peel strength adjusting agent; and a photoinitiator, the composition being solvent-free; and the adhesive layer has peel strength of 0.5 gf/in to 10 gf/in, as measured on glass at a peel angle of 180° and a peel rate of 1.8 m/min.

8 Claims, No Drawings

SURFACE PROTECTIVE FILM FOR OPTICAL MEMBER

The present invention is a National Phase entry pursuant to 35 U.S.C. § 371 of International Application No. PCT/KR2020/018136 filed Dec. 11, 2020, and claims priority to and the benefit of the filing date of Korean Patent Application No. 10-2019-0164905, filed on Dec. 11, 2019, in the Korean Intellectual Property Office, the disclosures of which are incorporated herein in their entirety by reference.

FIELD

The present invention relates to a surface protective film for an optical member.

BACKGROUND

An organic light-emitting diode (OLED), a self-luminous device, does not require a separate light source, unlike a liquid crystal display (LCD), and thus may be fabricated in a lightweight and thin form. In addition, the organic light-emitting diode is not only advantageous in terms of power consumption due to low voltage driving, but also has excellent response speed, viewing angle, and contrast ratio, and thus has been studied as a next-generation display.

The organic light-emitting diode has problems in that it is highly vulnerable to impurities, oxygen and moisture, and thus when it is exposed externally, or moisture or oxygen penetrates thereinto, the characteristics of the organic light-emitting diode are apt to deteriorate and the life time thereof is shortened. In order to overcome these problems, an encapsulation layer for preventing oxygen, moisture and the like from entering the interior of the organic light-emitting device is required.

The encapsulation layer includes a protective film for protecting the encapsulation layer during or after the fabrication process. The protective film is removed after lamination with the encapsulation layer, and needs to have low peel strength because there should be no damage to, or residue on, the encapsulation layer after removal of the protective film. In addition, the protective film is generally fabricated using a solvent, and has a problem in that bubbles are generated in the protective film or degradation of leveling occurs in the process of volatilizing the solvent.

SUMMARY

An object to be achieved by the present invention is to provide a surface protective film which is used in a process of fabricating an encapsulation layer for an organic light-emitting diode and which is capable of preventing bubbles from being generated in the protective film or degradation of leveling from occurring due to the volatilization of a solvent from the protective film.

However, the objects to be solved by the present invention are not limited to the above-mentioned object, and other objects which are not mentioned herein will be clearly understood by those skilled in the art from the following description.

One aspect of the present invention provides a surface protective film including an adhesive layer on one surface of a substrate film, wherein the adhesive layer is a cured product of a composition containing: a urethane-based resin having a photoreactive group at the end or side chain thereof; a monofunctional (meth)acrylate monomer; a cross-linking agent having two or more photoreactive groups at the end thereof; a peel strength adjusting agent; and a photoinitiator, the composition being solvent-free, and the adhesive layer has a peel strength of 0.5 gf/in to 10 gf/in, as measured on a glass at a peel angle of 180° and a peel rate of 1.8 m/min.

The surface protective film according to one aspect of the present invention may be fabricated without using a solvent and a solvent volatilization process, and thus it is possible to prevent bubbles from being generated in the protective film or leveling from being degraded. In addition, since the surface protective film is fabricated using a urethane resin which is photocurable, it is possible to improve productivity.

The effects of the present invention are not limited to the above-described effects, and effects which are not mentioned herein will be clearly understood by those skilled in the art from the present specification and the appended claims.

DETAILED DESCRIPTION

The terms and words used in the present specification and the appended claims should not be interpreted as being limited to typical meanings or dictionary definitions, but should be interpreted as having meanings and concepts consistent with the technical spirit of the present invention based on the rule according to which the inventors can appropriately define the concepts of the terms to describe their invention in the best manner. Accordingly, it should be understood that the embodiments described in the present specification and the configurations shown in the drawings are merely preferred examples, but do not cover all the technical spirits of the present invention, and thus there may be various equivalents and modifications capable of replacing them at the time of filing the present application.

Throughout the present specification, it is to be understood that when any part is referred to as "including" any component, it does not exclude other components, but may further include other components, unless otherwise specified.

Throughout the present specification, when any member is referred to as being "on" another member, it not only refers to a case where any member is in contact with another member, but also a case where a third member exists between the two members.

Throughout the present specification, the unit "parts by weight" may refer to the ratio of weight between components.

Throughout the present specification, the term "(meth)acrylate" is meant to include acrylate and methacrylate.

Throughout the present specification, the term "monomer unit" may mean the reacted form of a monomer in a polymer, and specifically, may mean a state in which the monomer forms the backbone of the polymer, for example, a main chain or a side chain, through a polymerization reaction.

Throughout the present specification, the term "solvent-free" may mean not including a solvent.

Hereinafter, the present invention will be described in more detail.

A surface protective film serving to protect an encapsulation layer in a process of fabricating an organic light-emitting diode needs to have low peel strength in order to prevent damage to, and avoid leaving residue on, the encapsulation layer. A conventional protective film is generally fabricated using a solvent, and has a problem in that bubbles are generated in the protective film or degradation of leveling occurs in the process of volatilizing the solvent.

One aspect of the present invention provides a surface protective film including an adhesive layer on one surface of a substrate film, wherein the adhesive layer is a cured product of a composition containing: a urethane-based resin having a photoreactive group at the end or side chain thereof; a monofunctional (meth)acrylate monomer; a cross-linking agent having two or more photoreactive groups at the end thereof; a peel strength adjusting agent; and a photoinitiator, the composition being solvent-free, and the adhesive layer has a peel strength of 0.5 gf/in to 10 gf/in, as measured on a glass at a peel angle of 180° and a peel rate of 1.8 m/min. According to the present invention, the surface protective film may be fabricated without using a solvent and a solvent volatilization process, and thus it is possible prevent bubbles from being generated in the protective film or the surface smoothness of the surface protective film from being degraded. In addition, since the surface protective film is fabricated using a urethane resin which is photocurable, it is possible to improve productivity.

According to one embodiment of the present invention, the substrate film may be a polyethylene terephthalate film, a polytetrafluoroethylene film, a polyethylene film, a polypropylene film, a polybutene film, a polybutadiene film, a vinyl chloride copolymer film, a polyurethane film, an ethylene-vinyl acetate film, an ethylene-propylene copolymer film, an ethylene-ethyl acrylate copolymer film, an ethylene-methyl acrylate copolymer film, or a polyimide film, but is not limited thereto. More specifically, the substrate film is preferably a polyethylene terephthalate (PET) film.

According to one embodiment of the present invention, the thickness of the substrate film may be 10 μm to 150 μm, 50 μm to 125 μm, or 50 μm to 100 μm. If the thickness of the substrate film when the substrate film having an adhesive layer formed thereon is laminated onto an encapsulation layer for an organic light-emitting diode is smaller than the lower limit of the above range, the substrate film may be apt to be deformed, and if the thickness of the substrate film is larger than the upper limit of the above range, lamination failure may occur.

According to one embodiment of the present invention, the substrate film may be subjected to suitable adhering treatment such as corona discharge treatment, UV irradiation treatment, plasma treatment or sputter etching treatment, but is not limited thereto.

According to one embodiment of the present invention, the urethane-based resin may be produced by reacting a composition containing a polyol and an isocyanate-based curing agent. The polyol may be one polyol or a mixture of two or more polyols, and the isocyanate-based curing agent may be a monofunctional or polyfunctional isocyanate-based curing agent. Polyfunctional means that two or more functional groups are bonded. For example, the urethane-based resin may be obtained from a cured product of a composition containing one or more selected from among a hydroxyl functional group, an amine functional group and a carboxyl functional group.

According to one embodiment of the present invention, the urethane-based resin may have a photoreactive group at the end or side chain thereof. Specifically, the urethane-based resin may be capped with a monofunctional acrylate having a hydroxyl group at the end or side chain thereof. More specifically, the urethane-based resin is preferably capped with 2-hydroxyethyl acrylate (2-hea) or 4-hydroxybutyl acrylate (4-hba) at the end or side chain thereof. As described above, the urethane-based resin contains a photoreactive group at the end or side chain thereof, and thus a photocuring reaction thereof may be easily performed.

According to one embodiment of the present invention, the polyol refers to an organic compound having two or more hydroxyl groups, and may be, for example, polyether polyol, polyalkylene polyol, polyester polyol, polycarbonate polyol, or polycaprolactone, but is not limited thereto. It is preferred that the polyol does not contain an additional group that reacts with the isocyanate (NCO) group, for example, an additional functional group. The polyol may be either a compound containing a hydroxyl group at the end thereof or a compound containing a lateral hydroxyl group distributed over the chain thereof. It is preferred that the polyol has 2 to 10, preferably 2 to 6 hydroxyl groups per molecule. The number-average molecular weight of the polyol may be 500 g/mol to 10,000 g/mol.

According to one embodiment of the present invention, examples of the polyol include, but are not limited to, (poly)ethylene glycol; (poly)propylene glycol; diethylene glycol; 1,3-propanediol(neopentyl glycol); 2-methyl-1,3-propanediol (MPD); 2-ethyl-2-butyl-1,3-propanediol; 1-ethyl-2-methyl-1,3-propanediol; 2-ethyl-2-methyl-1,3-propanediol; 1,3-butylene glycol; 1,4-butanediol; 2,3-butanediol; 2-butyl-2-ethyl-1,3-propanediol (BEPD); pentanediol; 2-methyl-2-ethyl-1,3-propanediol; 1,3-pentanediol; 2,2,4-trimethyl-1,3-pentanediol; hexylene glycol; 1,6-hexanediol; 1,4-cyclohexanediol; 1,4-cyclohexanedimethanol; 3-hydroxy-2,2-dimethylpropyl 3-hydroxy-2,2-dimethyl-propanoate (hydroxypivalyl hydroxypivalate (HPHP)); 2,2,4-trimethyl-1,3-pentanediol (TMPD); hydrogenated bisphenol A;

trimethylolpropane; pentaerythritol; ethoxylated and/or propoxylated forms of any of these polyols (such as propoxylated glycerol); and mixtures thereof.

According to one embodiment of the present invention, the isocyanate-based curing agent refers to an organic compound containing an isocyanate group, which reacts with a polyol to form a urethane-based resin (prepolymer). The isocyanate-based curing agent may contain an average of 6 or less, preferably 2 to 5, more preferably 2 to 4 isocyanate groups per molecule, but is not limited thereto. The isocyanate-based curing agent may be one or more selected from the group consisting of polyfunctional aliphatic, polyfunctional alicyclic, polyfunctional aromatic and heterocyclic isocyanate compounds which are publicly-known and commonly used in the art. In one embodiment, a diisocyanate containing two isocyanate groups may be used.

According to one embodiment of the present invention, the isocyanate-based curing agent that is used to produce the urethane-based resin may be selected from among oligomers, polymers or cyclic monomers of a diisocyanate compound, or conventional aliphatic or aromatic diisocyanate compounds.

Alternatively, an oligomer of a commercially available diisocyanate compound may also be purchased and used. Examples of the isocyanate-based curing agent that may be used in the present invention include, but are not limited to, ethylene diisocyanate, 1,4-tetramethylene diisocyanate, 1,6-hexamethylene diisocyanate (HDI), 1,12-dodecane diisocyanate, cyclobutane-1,3-diisocyanate, cyclohexane-1,3-diisocyanate, cyclohexane-1,4-diisocyanate, 1-isocyanato-3,3,5-trimethyl-5-isocyanatomethyl-cyclohexane, 2,4-hexahydrotoluene diisocyanate, 2,6-hexahydrotoluene diisocyanate, hexahydro-1,3-phenylene diisocyanate, hexahydro-1,4-phenylene diisocyanate, perhydro-2,4'-diphenylmethane diisocyanate, perhydro-4,4'-diphenylmethane diisocyanate, 1,3-phenylene diisocyanate, 1,4-phenylene diisocyanate, 4,4'-styrene diisocyanate, 3,3'-dimethyl-4,4'-biphenylene diisocyanate (TODI), toluene 2,4-diisocyanate, toluene 2,6-diisocyanate (TDI), diphenylmethane-2,4'-diisocyanate (MDI), 2,2'-diphenylmethane diisocyanate (MDI), diphenylmethane-4,4'-diisocyanate (MDI), isophorone diisocyanate (IPDI), and the like.

According to one embodiment of the present invention, examples of the monofunctional (meth)acrylate monomer include methyl (meth)acrylate, ethyl (meth)acrylate, n-propyl (meth)acrylate, isopropyl (meth)acrylate, n-butyl (meth) acrylate, t-butyl (meth)acrylate, sec-butyl (meth) acrylate, pentyl (meth) acrylate, 2-ethylhexyl (meth) acrylate, 2-ethylbutyl (meth) acrylate, n-octyl (meth)acrylate, isooctyl (meth)acrylate, isononyl (meth)acrylate, lauryl (meth)acrylate and tetradecyl (meth)acrylate, and one or a mixture of two or more selected from among the aforementioned monomers may be included in the adhesive layer. The monofunctional (meth)acrylate monomer may be contained in an amount of 50 to 200 parts by weight based on 100 parts by weight of the urethane-based resin.

According to one embodiment of the present invention, the crosslinking agent may be one selected from the group consisting of a polyfunctional (meth)acrylate monomer, a polyfunctional urethane (meth)acrylate oligomer, and a mixture thereof. As the crosslinking agent, a photocurable polyfunctional (meth)acrylate monomer may be preferably used. Examples of the polyfunctional (meth)acrylate include, but are not limited to, bifunctional acrylates such as 1,4-butanediol di(meth)acrylate, 1,6-hexanediol di(meth)acrylate, neopentylglycol di(meth)acrylate, polyethyleneglycol di(meth)acrylate, neopentylglycol adipate di(meth)acrylate, dicyclopentanyl di(meth)acrylate, caprolactone-modified dicyclopentenyl di(meth)acrylate, ethylene oxide-modified di(meth)acrylate, di(meth)acryloxy ethyl isocyanurate, allylated cyclohexyl di(meth)acrylate, tricyclodecanedimethanol (meth) acrylate, dimethylol dicyclopentanedi(meth)acrylate, ethylene oxide-modified hexahydrophthalic acid di(meth)acrylate, tricyclodecane dimethanol (meth)acrylate, neopentyl glycol-modified trimethylpropane di(meth)acrylate, adamantane di(meth)acrylate or 9,9-bis[4-(2-acryloyloxyethoxy)phenyl]fluorene; trifunctional acrylates such as trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, trifunctional urethane (meth)acrylate or tris(meth)acryloxyethyl isocyanurate;

tetrafunctional acrylates such as diglycerin tetra(meth)acrylate or pentaerythritol tetra(meth)acrylate;

pentafunctional acrylates such as dipentaerythritol penta (meth)acrylate; and hexafunctional acrylates such as dipentaerythritol hexa(meth)acrylate, caprolactone-modified dipentaerythritol hexa(meth)acrylate, or urethane (meth) acrylates (for example, reaction products of an isocyanate monomer and trimethylolpropane tri(meth)acrylate). These may be used alone or in combination of two or more thereof. By selecting the crosslinking agent from those described above, it is possible to improve pencil hardness and wettability.

According to one embodiment of the present invention, the peel strength adjusting agent may be, but is not limited to, diisononylcyclohexane-1,2-dicarboxylate (DINCH), bis-2-ethylhexyl hexanedioate (DEHA), dioctyl adipate (DOA), diisononyl adipate (DINA), dipropylene glycol dibenzoate (DPGDB), triethylene glycol bis-2-ethylhexanoate (TEG-EH), poly(isobutylene-co-para-methylstyrene) (IPMS), isopropyl palmitate (IPP), isopropyl myristate (IPMS), or a citrate-based compound. The peel strength adjusting agent may increase the wettability of the adhesive layer to an adherend layer, increase the soft physical properties of the adhesive layer, and improve the low-adhesive property of the adhesive layer.

According to one embodiment of the present invention, a citrate-based compound that is used as the peel strength adjusting agent may be, but is not limited to, triethyl citrate (TEC), acetyltriethyl citrate, tributyl citrate (TBC), acetyltributyl citrate (ATBC) or acetyltrioctyl citrate.

According to one embodiment of the present invention, the crosslinking agent may be contained in an amount of 5 parts by weight to 50 parts by weight based on 100 parts by weight of the urethane-based resin.

According to one embodiment of the present invention, the peel strength adjusting agent may be contained in an amount of 10 parts by weight to 250 parts by weight based on 100 parts by weight of the urethane-based resin. By adjusting the content of the peel strength adjusting agent within the above-described range, it is possible to improve pencil hardness and wettability.

According to one embodiment of the present invention, the photoinitiator may be an alpha-hydroxy ketone type compound, a benzyl ketal type compound, or a mixture thereof, but is not limited thereto. Preferably, the alpha-hydroxy ketone type compound may be used, such as 1-hydroxy-cyclohexyl-phenyl-ketone, 2-hydroxy 2-methyl-1-phenyl-1-propanone, 2-hydroxy-1-[4-(2-hydroxyethoxy)phenyl]-2-methyl-1-propanone, 2,2-dimethoxy-2-phenylacetophenone, or 2,4,6-trimethylbenzoyl-diphenyl phosphine oxide. These photoinitiators may be used alone or in combination of two or more thereof. The photoinitiator may be contained in an amount of 0.1 parts by weight to 5 parts by weight based on 100 parts by weight of the sum total of the urethane-based resin, the crosslinking agent, and the peel strength adjusting agent. When the above-described photoinitiator is used, it may be activated by UV light or an electron beam to activate a carbon-carbon double bond in the adhesive layer, causing a radical reaction.

According to one embodiment of the present invention, the composition may further contain an antistatic agent. Specifically, the antistatic agent may be one selected from among an organic salt type antistatic agent, an inorganic salt type antistatic agent, and a mixture thereof. A conventional protective film causes static electricity due to high surface electrical resistance resulting from the characteristics of the material thereof, and hence when the protective film is peeled from the encapsulation layer, an afterimage may remain on the encapsulation layer, and foreign matter such as dirt or dust may adhere to the encapsulation layer, causing a damage to the organic light-emitting diode and a defect in light emission of the organic light-emitting diode. The surface protective film of the present invention may prevent the adhesion of foreign substances caused by static electricity by further including an antistatic agent.

According to one embodiment of the present invention, the thickness of the adhesive layer may be appropriately selected in consideration of the purpose of the present invention. For example, the thickness of the adhesive layer may be 10 µm to 200 µm, preferably 10 µm to 150 µm, more preferably 10 µm to 100 µm. By setting the thickness of the adhesive layer within the above range, it is possible to provide an adhesive layer having excellent adhesive properties and wettability while being applicable to a surface protective film.

According to one embodiment of the present invention, the adhesive layer may be formed by curing an adhesive composition on the substrate film, but the method of forming the adhesive layer is not particularly limited. In one embodiment, the adhesive layer may be fabricated, for example, by a method in which the above-described adhesive composition or a coating solution prepared using the same is applied to a substrate layer by a conventional means such as an applicator coating device or a bar coater and cured.

According to one embodiment of the present invention, the adhesive layer may have a peel strength of 0.5 gf/in to 10 gf/in, preferably 1 gf/in to 6 gf/in, as measured on a glass at a peel angle of 180° and a peel rate of 1.8 m/min. The peel strength may be a peel strength measured on a glass, a plastic such as a polyimide film, or silicon nitride.

According to one embodiment of the present invention, the peel strength may be a peel strength measured on a glass. The peel strength may be measured by the peel strength evaluation method described in an Experimental Example below.

As used herein, the term "peel strength" may refer to a peel strength obtained by cutting a protective film to a size of 25 mm in width and 150 mm in length to prepare a specimen, attaching the adhesive layer of the protective film specimen to a glass by means of a 2-kg roller, storing the resultant at room temperature for 24 hours, and then measuring the peel strength while peeling the protective film specimen from the glass at a peel rate of 1.8 m/min and a peel angle of 180° using a Texture Analyzer (Stable Micro System, UK).

As used herein, the term "wettability" refers to the time taken for an adhesive to wet the entire surface of an adherend, and wettability may be measured using a method which is generally used in the art. For example, wettability may be measured by a wettability evaluation method described in an Experimental Example below.

According to one embodiment of the present invention, the adhesive layer may have a wetting time of 1 to 10 seconds on glass. Specifically, the wetting time may be 2 to 9 seconds, 3 to 8 seconds, 4 to 7 seconds, or 5 to 6 seconds. When the adhesive layer has a wetting time within the above-described range, the adhesive layer may be peeled without leaving an afterimage.

Hereinafter, the present invention will be described in detail with reference to examples. However, the examples according to the present invention may be modified into various different forms, and the scope of the present invention is not construed as being limited to the examples described below. The examples in the present specification are provided to more completely describe the present invention to those skilled in the art.

EXAMPLES

Example 1

(1) Preparation of Adhesive Composition

A 2-L 5-neck glass reactor equipped with a reflux condenser was prepared, and then 764 g of the bifunctional polyol SC-2204 (Mn-2,000 g/mol, KPX Chemical Co., Ltd.) and 110 g of dicyclohexylmethylene diisocyanate (H12MDI, Evonik) were placed therein, and then 300 g of 2-ethylhexyl acrylate (2-EHA, LG Chem.) and 300 g of lauryl acrylate (M120, Miwon Specialty Chemical Co., Ltd.) were sequentially added thereto. After completion of the addition, the mixture was heated to and kept at 70° C. to become a homogeneous phase while it was stirred at a speed of 100 rpm. At the same temperature, 50 ppm of DBTDL was added to the mixture to induce an NCO prepolymer reaction, and the mixture was kept at 78 to 82° C. for 3 hours. Thereafter, 26 g of 2-HEA (Nippon Shokubai Co., Ltd.) was added to the mixture which was then allowed to react at 80° C. for 3 hours until the FT-IR NCO peak (2,260 cm$^{-1}$) disappeared, thereby producing a polyurethane acrylate resin.

100 parts by weight of the produced polyurethane adhesive resin, and based on 100 parts by weight of the adhesive resin, 140 parts by weight of 2-ethylhexyl acrylate (2-EHA), 36 parts by weight of the crosslinking agent trimethylolpropane triacrylate (TMPTA) and 53 parts by weight of the peel strength adjusting agent isopropyl myristate (IPMS) were mixed together to prepare a mixture. 1 part by weight of a photoinitiator (Irgacure 184) was added to 100 parts by weight of the mixture, thus preparing an adhesive composition.

(2) Fabrication of Protective Film

As a substrate film, a 75-μm-thick polyethylene terephthalate (PET) film (H33P, Kolon Inc.) whose both surfaces were coated with a 50-nm-thick antistatic layer was prepared. As a protective layer, a film (12ASW, SKC) was prepared, in which antistatic layers were formed on both surfaces of a 50-μm-thick polyethylene terephthalate (PET) film (XD510P, TAK) and one of the antistatic layers was coated with a release layer.

Next, an excessive amount of the adhesive composition was applied onto one surface of the substrate film, and then the substrate film and the release layer were laminated to face each other, and coating was performed so that the thickness of the adhesive composition between the substrate film and the release layer became 75 μm. The applied adhesive composition was photocured using a light source (black light) under light energy of 700 mJ/cm$^2$, thereby fabricating a surface protective film.

Example 2

A surface protective film was fabricated in the same manner as in Example 1, except that 130 parts by weight of 2-ethylhexyl acrylate (2-EHA), 10 parts by weight of the crosslinking agent urethane acrylate (PU5000) instead of the crosslinking agent trimethylolpropane triacrylate (TMPTA), and 45 parts by weight of a peel strength adjusting agent isopropyl myristate (IPMS) were used in the preparation of the adhesive composition.

Example 3

A surface protective film was fabricated in the same manner as in Example 1, except that 20 parts by weight of the crosslinking agent 1,6-hexanediol diacrylate (HDDA) instead of the crosslinking agent trimethylolpropane triacrylate (TMPTA), 95 parts by weight of the peel strength adjusting agent acetyl tributyl citrate (ATBC) instead of the peel strength adjusting agent isopropyl myristate (IPMS), and 2 parts by weight of the photoinitiator (Irgacure 184) were used in the preparation of the adhesive composition.

Example 4

A surface protective film was fabricated in the same manner as in Example 1, except that 53 parts by weight of the peel strength adjusting agent tri(ethylene glycol)bis(2-ethylhexanoate) (TEG-EH) instead of the peel strength adjusting agent isopropyl myristate (IPMS), and 0.5 parts by weight of the photoinitiator (Irgacure 184) were used in the preparation of the adhesive composition.

Example 5

A surface protective film was fabricated in the same manner as in Example 1, except that 95 parts by weight of 2-ethylhexyl acrylate (2-EHA), 30 parts by weight of the crosslinking agent trimethylolpropane triacrylate (TMPTA), 42 parts by weight of the peel strength adjusting agent isopropyl myristate (IPMS), and 0.5 parts by weight of the photoinitiator (Irgacure 184) were used in the preparation of the adhesive composition.

Comparative Example 1

A surface protective film was fabricated in the same manner as in Example 1, except that the peel strength adjusting agent isopropyl myristate (IPMS) was not used in the preparation of the adhesive composition.

Comparative Example 2

A surface protective film was fabricated in the same manner as in Example 1, except that 120 parts by weight of 2-ethylhexyl acrylate (2-EHA), and 160 parts by weight of the peel strength adjusting agent acetyl tributyl citrate (ATBC) instead of the peel strength adjusting agent isopropyl myristate (IPMS) were used in the preparation of the adhesive composition, and the crosslinking agent trimethylolpropane triacrylate (TMPTA) was not used in the preparation of the adhesive composition.

Comparative Example 3

A surface protective film was fabricated in the same manner as in Example 1, except that 160 parts by weight of 2-ethylhexyl acrylate (2-EHA), 70 parts by weight of the crosslinking agent trimethylolpropane triacrylate (TMPTA), 300 parts by weight of the peel strength adjusting agent acetyl tributyl citrate (ATBC) instead of the peel strength adjusting agent isopropyl myristate (IPMS), and 2 parts by weight of the photoinitiator (Irgacure 184) were used in the preparation of the adhesive composition.

Comparative Example 4

A surface protective film was fabricated in the same manner as in Example 5, except that 3 parts by weight of the crosslinking agent trimethylolpropane triacrylate (TMPTA) was used.

Comparative Example 5

A surface protective film was fabricated in the same manner as in Example 5, except that 58 parts by weight of the crosslinking agent trimethylolpropane triacrylate (TMPTA) was used.

Comparative Example 6

A surface protective film was fabricated in the same manner as in Example 5, except that 8 parts by weight of the peel strength adjusting agent isopropyl myristate (IPMS) was used.

Comparative Example 7

A surface protective film was fabricated in the same manner as in Example 5, except that 258 parts by weight of the peel strength adjusting agent isopropyl myristate (IPMS) was used.

Comparative Example 8

A surface protective film was fabricated in the same manner as in Example 5, except that 67 parts by weight of 2-ethylhexyl acrylate (2-EHA) was used and no curing agent was used.

Comparative Example 9

A surface protective film was fabricated in the same manner as in Example 5, except that 217 parts by weight of 2-ethylhexyl acrylate (2-EHA) was used and no curing agent was used.

Experimental Examples

The physical properties of the protective films of the Examples and the Comparative Examples were evaluated by the following methods, and the results of the evaluation are shown in Table 1 below.

Experimental Example 1: Evaluation of Peel Strength

Each of the surface protective films fabricated in Examples 1 to 5 and Comparative Examples 1 to 9 was cut to a size of 25 mm in width and 150 mm in length to prepare specimens. The adhesive layer of each of the surface protective films was attached to a glass by means of a 2-kg roller, followed by storage at room temperature for 24 hours. Next, the peel strength was measured when each of the surface protective films was peeled from the glass at a peel rate of 1.8 m/min and a peel angle of 180° using a Texture Analyzer (Stable Micro System, UK).

Experimental Example 2: Evaluation of Wettability

Each of the surface protective films fabricated in Examples 1 to 5 and Comparative Examples 1 to 9 was cut to a size of 70 mm×100 mm, and each substrate film having the adhesive layer formed thereon was attached to a glass and the time taken for the glass to be completely wetted with the adhesive layer was measured. The wetting time was evaluated as follows. A wetting time of less than 10 seconds: O; a wetting time of 10 seconds to less than 20 seconds: Δ; and a wetting time of more than 20 seconds: X.

Experimental Example 3: Evaluation of Pencil Hardness

For the specimens of the surface protective films fabricated in Examples 1 to 5 and Comparative Examples 1 to 9, the surface pencil hardness of each specimen was measured using a pencil hardness tester (Chungbuk Tech) under a load of 100 g. A scratch was applied to the surface of each specimen using a standard pencil B (Mitsubishi) at a fixed angle of 45°, and whether or not the surface was scratched was observed.

The results were evaluated as follows. O: there was no pressed mark on the surface; Δ: only a pressed mark was created on the surface; and X: the surface was scratched. The measurement results are presented as the average values of five repeated measurements.

TABLE 1

|  | Peel strength (gf/in) | Wettability evaluation | Pencil hardness evaluation |
|---|---|---|---|
| Example 1 | 3.1 | ○ | ○ |
| Example 2 | 3.5 | ○ | ○ |
| Example 3 | 4.6 | ○ | ○ |
| Example 4 | 5.1 | ○ | ○ |
| Example 5 | 2.5 | ○ | ○ |
| Comparative Example 1 | 6.0 | X | ○ |
| Comparative Example 2 | 208 | X | X |
| Comparative Example 3 | 14.5 | ○ | ○ |
| Comparative Example 4 | 2.0 | ○ | Δ |
| Comparative Example 5 | 2.0 | Δ | Δ |
| Comparative Example 6 | 7.9 | ○ | ○ |
| Comparative Example 7 | 0.7 | ○ | X |
| Comparative Example 8 | 3.0 | ○ | Δ |
| Comparative Example 9 | 2.0 | ○ | Δ |

Referring to Table 1, it was confirmed that Comparative Example 1 including no peeling strength adjusting agent did not satisfy wettability evaluation, and Comparative Example 2 including no crosslinking agent did not satisfy wettability evaluation and pencil hardness evaluation due to a rapid increase in the peel strength. Furthermore, it was confirmed that Comparative Example 3 including an excessive amount of the crosslinking agent showed excessively high peel strength. In addition, it was confirmed that Comparative Example 4 including a small amount of the crosslinking agent did not satisfy pencil hardness evaluation, Comparative Example 5 including an excessive amount of the crosslinking agent did not satisfy wettability evaluation and pencil hardness evaluation, and Comparative Example 6 including a small amount of the peel strength adjusting agent showed excessively high peel strength. In addition, it was confirmed that Comparative Example 7 including an excessive amount of the peeling strength adjusting agent did not satisfy pencil hardness evaluation, Comparative Example 8 including a small amount of 2-ethylhexyl acrylate (2-EHA), which is a monofunctional (meth)acrylate monomer, did not satisfy pencil hardness evaluation, and Comparative Example 9 including an excessive amount of 2-ethylhexyl acrylate (2-EHA), which is a monofunctional (meth)acrylate monomer, did not satisfy pencil hardness evaluation.

In contrast, it was confirmed that Examples 1 to 5 satisfied both wettability and pencil hardness while maintaining proper peel strength.

Although the present invention has been described above with reference to the limited embodiment, the present invention is not limited thereto, and various modifications and alterations may be made by those skilled in the art without departing from the technical spirit of the present invention and equivalents to the appended claims.

The invention claimed is:

1. A surface protective film comprising an adhesive layer on one surface of a substrate film, wherein:

the adhesive layer is a cured product of a composition containing: a urethane-based resin having a photoreactive group at an end or side chain thereof; a monofunctional (meth)acrylate monomer; a crosslinking agent having two or more photoreactive groups at an end thereof; a peel strength adjusting agent; and a photoinitiator, the composition being solvent-free; and the adhesive layer has a peel strength of 0.5 gf/in to 10 gf/in, as measured on glass at a peel angle of 180° and a peel rate of 1.8 m/min, and a wetting time of 1 to 10 seconds on glass, wherein the monofunctional (meth)acrylate monomer is provided in an amount of 95 parts by weight to 140 parts by weight based on 100 parts by weight of the urethane-based resin, wherein the crosslinking agent is provided in an amount of 10 parts by weight to 36 parts by weight based on 100 parts by weight of the urethane-based resin, wherein the peel strength adjusting agent is provided in an amount of 42 parts by weight to 95 parts by weight based on 100 parts by weight of the urethane-based resin and, wherein the peel strength adjusting agent is one selected from the group consisting of diisononylcyclohexane-1, 2-dicarboxylate (DINCH), bis-2-ethylhexyl hexanedioate (DEHA), dioctyl adipate (DOA), diisononyl adipate (DINA), dipropylene glycol dibenzoate (DPGDB), triethylene glycol bis-2-ethylhexanoate (TEG-EH), isopropyl palmitate (IPP), isopropyl myristate (IPMS), a citrate-based compound, and mixtures thereof.

2. The surface protective film of claim 1, wherein the urethane-based resin is obtained by reacting a polyol with an isocyanate-based curing agent.

3. The surface protective film of claim 2, wherein the polyol is one selected from the group consisting of ethylene glycol, diethylene glycol, polypropylene glycol, and combinations thereof.

4. The surface protective film of claim 2, wherein the isocyanate-based curing agent is one selected from the group consisting of polyfunctional aliphatic isocyanate compounds, polyfunctional alicyclic isocyanates, polyfunctional aromatic isocyanates, and combinations thereof.

5. The surface protective film of claim 1, wherein the crosslinking agent is one selected from the group consisting of a polyfunctional (meth)acrylate monomer, a polyfunctional urethane (meth)acrylate oligomer, and a mixture thereof.

6. The surface protective film of claim 1, wherein the photoinitiator is provided in an amount of 0.1 parts by weight to 5 parts by weight based on 100 parts by weight of the sum total of the urethane-based resin, the crosslinking agent and the peel strength adjusting agent.

7. The surface protective film of claim 1, wherein the composition further comprises an antistatic agent.

8. The surface protective film of claim 1, wherein the adhesive layer has a thickness of 10 μm to 100 μm.

* * * * *